United States Patent Office 3,005,819
Patented Oct. 24, 1961

3,005,819
PROCESS FOR THE PRODUCTION OF MELAMINE
AND GUANIDINE SULPHATE
Harry Edward Jackson, Rossland, British Columbia,
Canada, assignor to The Consolidated Mining and
Smelting Company of Canada Limited, Montreal, Quebec, Canada, a company of Canada
No Drawing. Filed Aug. 13, 1959, Ser. No. 833,393
6 Claims. (Cl. 260—249.7)

This invention relates to a process for the production of melamine and guanidine sulphate. It is particularly directed to providing a process which, if desired, can be operated on a continuous basis with a high yield of desired products.

Processes are known and are in commercial use for the production of melamine. It is known, for example, that melamine can be produced by reacting urea and ammonia with at least one of the group ammonium sulphamate and sulphur dioxide.

The production of melamine by reacting urea and ammonia with at least one of the group ammonium sulphamate and sulphur dioxide is illustrated by the following equations:

$$6CO(NH_2)_2 + 9SO_2 + 12NH_3 \rightarrow 2C_3N_6H_6 + 6(NH_4)_2SO_4 + 3S \quad (1)$$

$$3CO(NH_2)_2 + 3NH_4SO_3NH_2 \rightarrow C_3N_6H_6 + 3(NH_4)_2SO_4 \quad (2)$$

These reactions are conducted at a relatively high temperature, usually above about 280° C. and under a superatmospheric pressure of ammonia, usually above 500 pounds per square inch.

It is found that reactions involving the reactants of Equations 1 and 2 can be conducted at a temperature below about 280° C. to produce guanidine sulphate, as illustrated by the following equations:

$$2CO(NH_2)_2 + 3SO_2 + 4NH_3 \rightarrow (H_2NCNHNH_2)_2H_2SO_4 + (NH_4)_2SO_4 + S \quad (3)$$

$$2CO(NH_2)_2 + 2NH_4SO_3NH_2 \rightarrow (H_2NCNHNH_2)_2H_2SO_4 + (NH_4)_2SO_4 \quad (4)$$

Thus, by controlling the temperature at which the reactions are conducted, from the groups of reactants indicated in the above equations, a reaction product can be obtained which contains a high yield of melamine or of guanidine sulphate or of both melamine and guanidine sulphate. In addition to guanidine sulphate being a possible product here, it is known that melamine can be produced from guanidine sulphate as an initial reactant.

It has been found that another product, guanidine sulphamate, may be formed during the reaction of urea and ammonia with one of the group sulphur dioxide and ammonium sulphamate, and some of it, which has not been converted to melamine during the reactions, usually is present in the reaction product. This guanidine sulphamate can be separated from the reaction product and passed to further treatment for its recovery as a marketable product or it can be returned to the reaction vessel as an initial reactant in the production of melamine. In point of fact, the production of melamine from guanidine sulphamate as an initial reactant may be considered a variation of the process illustrated by Equations 1 and 2.

The presence of guanidine sulphamate with the other reactants charged into the reaction vessel is of advantage in the operation of the process. Unlike melamine, ammonium sulphate and guanidine sulphate, which are present in the reaction product as solids, guanidine sulphamate is molten at reaction temperatures and serves as a liquid carrier for the reaction products.

The use of guanidine sulphamate as a molten carrier for the solids present in the products of Reactions 1 and 2 has the important advantages of permitting the operation of the process on a continuous basis with attendant savings in capital and operating costs of equipment. This improved process is fully described in and forms the subject matter of United States Patent No. 2,824,104, issued February 18, 1958.

While this improved process for the production of melamine has definite advantages over known processes of the prior art, it is found that, due to the segregation of solids in the reaction product, it is difficult to maintain the operation of the process on a continuous basis and obtain a yield of melamine in the reaction product greater than about 55% of the theoretical yield based on the carbon content of the urea and guanidine sulphamate.

I have found that a process or processes utilizing the reactants and reactions set out hereinabove can be conducted on a continuous basis under controlled conditions to produce reaction products which contain yields of melamine up to 80% or higher of the theoretical yield based on the carbon content of the urea by including elemental sulphur with the reactants charged into the reaction vessel in amount sufficient to provide a fluid stream which acts as a carrier, without appreciable segregation of solids contained in the reaction product.

I have found that when elemental sulphur is charged into the reaction vessel in admixture with the initial reactants urea, ammonia and ammonium sulphamate or sulphur dioxide in at least about 40%, by weight, of the initial reactants, i.e., excluding the weight of the elemental sulphur and excess ammonia, the process can be operated on a continuous basis to produce a yield of melamine up to 80% and higher, of the theoretical yield according to Equations 1 or 2, or to produce guanidine sulphate, or to produce a mixture of melamine and guanidine sulphate.

The reactants employed in the operation of this process are urea, ammonia, and at least one of the compounds sulphur dioxide and ammonium sulphamate. The reactants are provided, preferably, in about the stoichiometric amounts indicated by Equations 1, 2, 3 or 4. Ammonia is provided to maintain a pressure of at least about 200 pounds per square inch and, preferably, from about 500 to 1000 pounds per square inch.

It is preferred, in the operation of the process, to form as uniform a mixture of the reactants as is economically practical prior to charging them into the reaction vessel. This procedure results, in effect, in a number of discrete reaction zones in the reaction vessel, each of which contains the desired ratio of reactants and is surrounded and separated from other zones by the molten carrier. When apparatus is used in which there is only a short retention period at reaction temperature, such as in a tubular reactor, the mixing must be effected before the reactants reach that point in the reactor at which the reaction is initiated and takes place. The preliminary mixing can be effected outside the reaction vessel or in the reaction vessel prior to the initiation of the reaction. This mixing operation can be conducted in the reaction vessel with a conventional agitating or stirring device and, preferably, is conducted when the temperature of the unreacted mixture is within the range of from about 120° C. to about 200° C. in the production of guanidine sulphate and of from about 120° C. to about 240° C. in the production of melamine.

A minor amount of a catalyst, such as boron, or a compound thereof, in amount greater than about 0.001% by weight of the reactants, or a compound of phosphorus, arsenic or antimony in amount greater than about 0.01% by weight of the reactants can be provided, if desired, in the reaction mixture to facilitate and expedite the reaction for the production of melamine.

The process can be operated with the reaction vessel maintained at a temperature within the range of from about 220° C. to about 280° C., preferably from about 240° to about 260° C. for the production of guanidine sulphate; within the range of from about 260° to about 360° C., preferably from about 260° to about 300° C. for the production of melamine; and preferably within the range of from about 240° to 260° C. for the production of a reaction product which contains a mixture of guanidine sulphate and melamine in economic yields.

The period of the reaction, or the time of retention of the mixture of reactants at reaction temperature, depends on whether guanidine sulphate, melamine, or a mixture of guanidine sulphate and melamine is desired in the reaction product, and the temperature at which the reaction is conducted. In general, the time of retention for an economically practical yield of desired product or products varies inversely with the temperature. For example, a yield of guanidine sulphate equivalent to about 40% of the theoretical yield based on the carbon content of the urea was obtained in 45 minutes by conducting the reaction at 240° C. Approximately the same yield was obtained in 120 minutes at 212° C. The combined guanidine sulphate-melamine yield, however, is higher when using a shorter reaction period at a higher temperature, for under these conditions, substantially all the urea will react to form either melamine or guanidine sulphate.

When operating the process for the production of melamine alone, a saisfactory yield can be obtained within 4 hours at a temperature of about 268° C. However, an improved conversion and a higher yield of melamine can be obtained in only 2 hours at 280° C. Satisfactory yields of melamine also can be obtained in shorter reaction periods at even higher temperatures although operation at too high a temperature, particularly above about 320° C., favours the decomposition of melamine and the formation of undesirable compounds such as ammeline and melam.

There are several known procedures for the separation of the desired melamine and/or guanidine sulphate from the reaction product and for the purification thereof. A suitable procedure includes the steps of leaching the reaction product with water at, for example, 50° C. to 60° C. to dissolve such compounds as ammonium sulphate, ammonium sulphamate, guanidine sulphate and guanidine sulphamate, then cooling the solution to about 20° C. to 30° C., leaving the melamine, which is sparingly soluble in water at room temperature, in the undissolved residue. The undissolved residue is then leached with agitation in hot water at about 80° C. to 100° C. in which the melamine is soluble. Elemental sulphur and any remaining undissolved solids present in the residue can be separated from the hot melamine solution, for example, by filtration. Melamine can be separated from the hot water leach solution by cooling the solution and thereby effecting precipitation of the melamine by crystallization. The melamine recovered from the crystallization step is a relatively pure product but can be further purified, if desired, by known procedures such as disclosed in United States Patent No. 2,816,891, issued December 17, 1957.

Guanidine sulphate and ammonium sulphate can be recovered by fractional crystallization from the solution derived from the cold water leaching of the reaction product.

Undissolved residue from the hot water leaching step is dried and returned to the reaction vessel. However, as elemental sulphur is produced in the reaction of that modification of the process utilizing sulphur dioxide and undesirable by-products such as ammeline and melam may be formed by the decomposition of melamine during the reaction, it is preferred to withdraw a portion of the residue recycled to the reaction vessel to prevent accumulation of sulphur and undesirable by-products in the process.

The operation of the process involves only the use of conventional and readily available apparatus such as autoclaves as reaction vessels. Process apparatus usually includes cooling vessels and pressure release vessels from which excess ammonia can be recovered and re-cycled to the reaction vessel.

In the modification using urea, sulphur dioxide and ammonia as initial reactants, a preliminary mixing vessel can be provided, which operates at a lower temperature than the reaction vessel, for thorough mixing of the reactants and for the initiation of a preliminary reaction between the sulphur dioxide and ammonia before the reaction mixture is subjected to final synthesis conditions. This latter procedure, which forms the subject matter of United States Patent No. 2,899,433, issued August 11, 1959, avoids the presence in the reaction mixture of unreacted sulphur dioxide which, if present, can cause difficulties in the operation of the process through its reaction with ammonia to form undesired compounds at later stages in the operation.

Sulphur can be added to the process either in the preliminary mixing vessel or in the reaction autoclave, the former being preferred for the reaction using sulphur dioxide. Initial additions of elemental sulphur are, preferably, made in the form of finely divided particles though recirculated material may be molten sulphur. While sulphur should be present in at least about 40%, by weight of the initial reactants indicated in Equations 1, 2, 3 and 4, there is no upper limit as to the amount which can be present except as dictated by economic considerations. It is preferred, also, to provide the sulphur dioxide and ammonia in liquid form, from which state they may be vapourized immediately before injection into the mixing vessel or the reaction autoclave. The urea can be melted before addition to the reaction vessel and the ammonium sulphamate and the guanidine sulphamate, if it is used with urea, are preferably admixed with molten urea. All of the reactants are, preferably, free from moisture.

The operation of the process of this invention is illustrated by the following examples in which a 500 cc. stainless steel, glass lined, electrically heated, high pressure autoclave fitted with a stirring head and a thermometer well was used as the reaction vessel. The stirrer or agitator used was T-shaped, made of titanium and rotated at 58 r.p.m.

*Example I*

15 grams (0.25 mol) of urea and 31.3 grams (0.25 mol+10% excess) ammonium sulphamate were melted together to assure contact in correct proportions. This mixture was charged into the reaction vessel with 50 grams of finely divided particles of elemental sulphur and about 70 cc. of anhydrous liquid ammonia to provide a partial pressure of ammonia of about 700 pounds per square inch. The vessel was sealed and the temperature of the mixture was increased to about 150° C., at which temperature the stirrer was started. Heating was continued to increase the temperature to 240° C. and the vessel was maintained at that temperature for 45 minutes. The contents of the vessel were then cooled and when the temperature reached 150° C. the stirrer was stopped. Yields of guanidine sulphate and melamine were 38% and 39.3%, respectively, of the theoretical yields based on the carbon content of the urea as indicated in Equations 2 and 4.

*Example II*

Example I was repeated with the difference that the contents of the reaction vessel were heated to and maintained at 268° C. for a period of 4 hours. The reaction product was analyzed and showed a yield of melamine of 82.8% based on the carbon content of the urea, and no guanidine.

*Example III*

A mixture of 15 grams (0.25 mol) of urea, 25 cc. liquid sulphur dioxide (equal to 0.25 mol ammonium sulphamate+10% excess), 50 grams of finely divided elemental sulphur particles and 70 cc. of anhydrous liquid ammonia were charged into the reaction vessel. The contents of the reaction vessel were heated to a temperature of 150° C. and the stirrer was started. Heating was continued to 280° C. and the contents of the vessel were maintained at that temperature for 4 hours. After cooling, the reaction product was analyzed and showed yields of guanidine sulphate and melamine of 50.5% and 32.1%, respectively, of the theoretical yield based on the carbon content of the urea as indicated in Equations 1 and 3.

*Example IV*

Example I was repeated with the difference that 0.46 gram of $B_2O_3$ (1% of the total amount of the urea and ammonium sulphamate) was added with the reactants, the partial pressure of the excess ammonia was about 1000 pounds per square inch, and the reaction vessel was heated to and maintained at 276° C. for a period of 4 hours. Analysis of the reaction product showed yields of guanidine sulphate, melamine and ammeline of 1.34%, 89.5% and 2.9%, respectively, of the theoretical yields based on the carbon content of the urea as indicated in Equations 2 and 4.

The process of the present invention is applicable to the production of melamine from several groups of reactants, or mixtures thereof, by heating under a superatmospheric pressure of added ammonia. These groups include:

(a) Urea, ammonia and sulphur dioxide, in which case the reaction product contains melamine, ammonium sulphate and sulphur formed by the reaction and, if the reaction to melamine is not allowed to proceed to completion, guanidine as sulphate or as sulphamate. The guanidine compound, in either case, can be returned to the reaction vessel for conversion to melamine.

(b) Urea and ammonium sulphamate, in which case there is no sulphur formed by the reaction, but otherwise the reaction product is the same as in (a).

(c) Guanidine sulphamate, in which case the reaction product would include melamine and ammonium sulphamate but would not normally include guanidine compounds, and no sulphur would be formed.

(d) Guanidine sulphate, in which case the reaction product would include melamine and ammonium sulphate, but would not normally include guanidine compounds, and no sulphur would be formed.

Impurities in the reaction product might include ammeline and melamine condensation products.

An important advantage of the process of the present invention, in which sulphur is used as the carrier medium, is that the reaction to form melamine can be carried to completion, thereby avoiding the necessity for incorporating in the overall process separate recovery steps for the separation of guanidine compounds from the major constituents of the reaction product. These major constituents, melamine and ammonium sulphate, are easily separated from each other and from the circulating stream of sulphur used in the process.

What I claim as new and desire to protect by Letters Patent of the United States is:

1. In a process for the production of a member selected from the group consisting of guanidine sulphate and melamine in which urea, ammonia and at least one member selected from the group consisting of sulphur dioxide and ammonium sulphamate are reacted in a reaction vessel as a temperature above about 200° C. and under a superatmospheric pressure of ammonia and at least one member of the first mentioned group is separated and recovered from the reaction product, the improvement which comprises providing elemental sulphur in the mixture subjected to reaction in amount constituting at least about 40%, by weight, of the reactants.

2. The process according to claim 1 in which reactants are charged continuously into and reaction product is discharged continuously from the reaction vessel, elemental sulphur is separated from the reaction product, and at least part of the so-recovered elemental sulphur is recycled to the reaction vessel.

3. The process according to claim 2 in which part of the elemental sulphur recovered from the reaction product is continuously withdrawn from the process.

4. The process according to claim 1 in which the process is conducted at a temperature within the range of from 200° to 280° C. for the production of guanidine sulphate; within the range of from about 260° to about 360° C. for the production of melamine; and within the range of from about 240° C. to about 280° C. for the production of guanidine sulphate and melamine.

5. In a continuous process for the production of melamine in which ammonia and at least one group of compounds selected from the groups of compounds consisting of (a) urea and ammonium sulphamate, (b) urea and sulphur dioxide, (c) guanidine sulphamate, and (d) guanidine sulphate, are reacted in a reaction zone at a temperature within the range of from about 200° C. to about 360° C. under a superatmospheric pressure of ammonia, the improvement in which the reaction is conducted in a circulating stream of molten elemental sulphur, said elemental sulphur being present in the reaction mixture in amount constituting at least about 40% by weight of the reactants.

6. In a process for the production of melamine in which ammonia and at least one group of compounds selected from the groups of compounds consisting of (a) urea and ammonium sulphamate, (b) urea and sulphur dioxide, and (c) guanidine compound, are reacted in a reaction zone in the presence of at least one substance selected from the group of substances consisting of (a) boron, (b) compounds of boron, (c) compounds of phosphorous, (d) compounds of antimony, and (e) compounds of arsenic, at a temperature within the range of from about 200° C. to about 360° C. under a superatmospheric pressure of ammonia, the improvement which comprises providing elemental sulphur in the mixture subjected to reaction in amount constituting at least about 40%, by weight, of the reactants.

References Cited in the file of this patent

UNITED STATES PATENTS

| 2,762,843 | Boivin | Sept. 11, 1956 |
| 2,826,579 | Barnes et al. | Mar. 11, 1958 |
| 2,857,381 | Jackson et al. | Oct. 21, 1958 |

FOREIGN PATENTS

| 162,088 | Australia | Mar. 21, 1955 |

OTHER REFERENCES

Marecek: Chemicky Abzor, vol. 23, pages 217–221 (December 1948).

UNITED STATES PATENT OFFICE
CERTIFICATE OF CORRECTION

Patent No. 3,005,819            October 24, 1961

Harry Edward Jackson

It is hereby certified that error appears in the above numbered patent requiring correction and that the said Letters Patent should read as corrected below.

Column 3, line 2, for "220° C." read -- 200° C. --.

Signed and sealed this 3rd day of April 1962.

(SEAL)
Attest:

ERNEST W. SWIDER
Attesting Officer

DAVID L. LADD
Commissioner of Patents